June 8, 1948. J. P. BUTTERFIELD 2,442,917
SUPPORTING STRUCTURE FOR BEARINGS FOR PISTON-CONNECTED SHAFTS
Filed Aug. 17, 1942 2 Sheets-Sheet 1
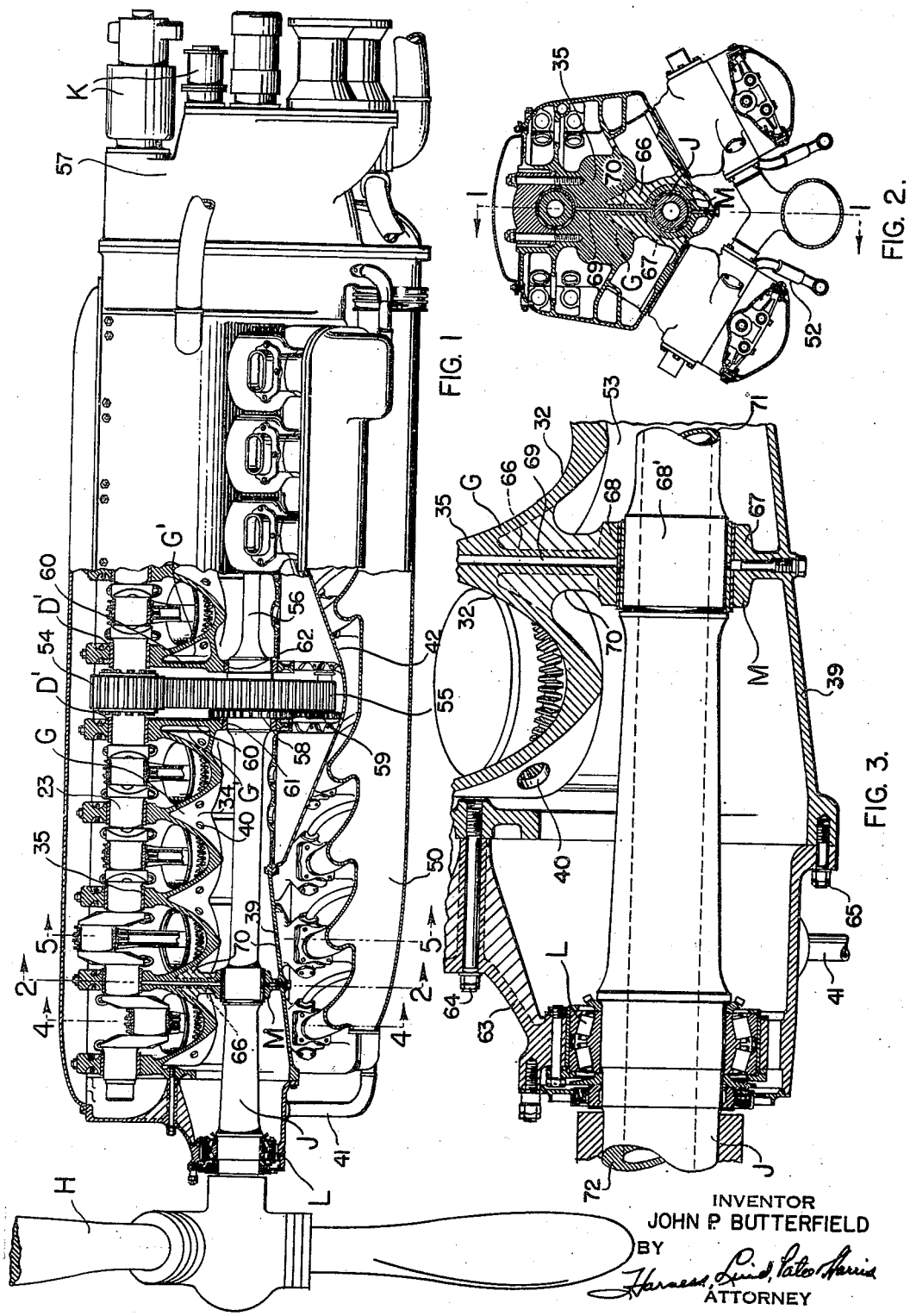
INVENTOR
JOHN P. BUTTERFIELD
BY
ATTORNEY

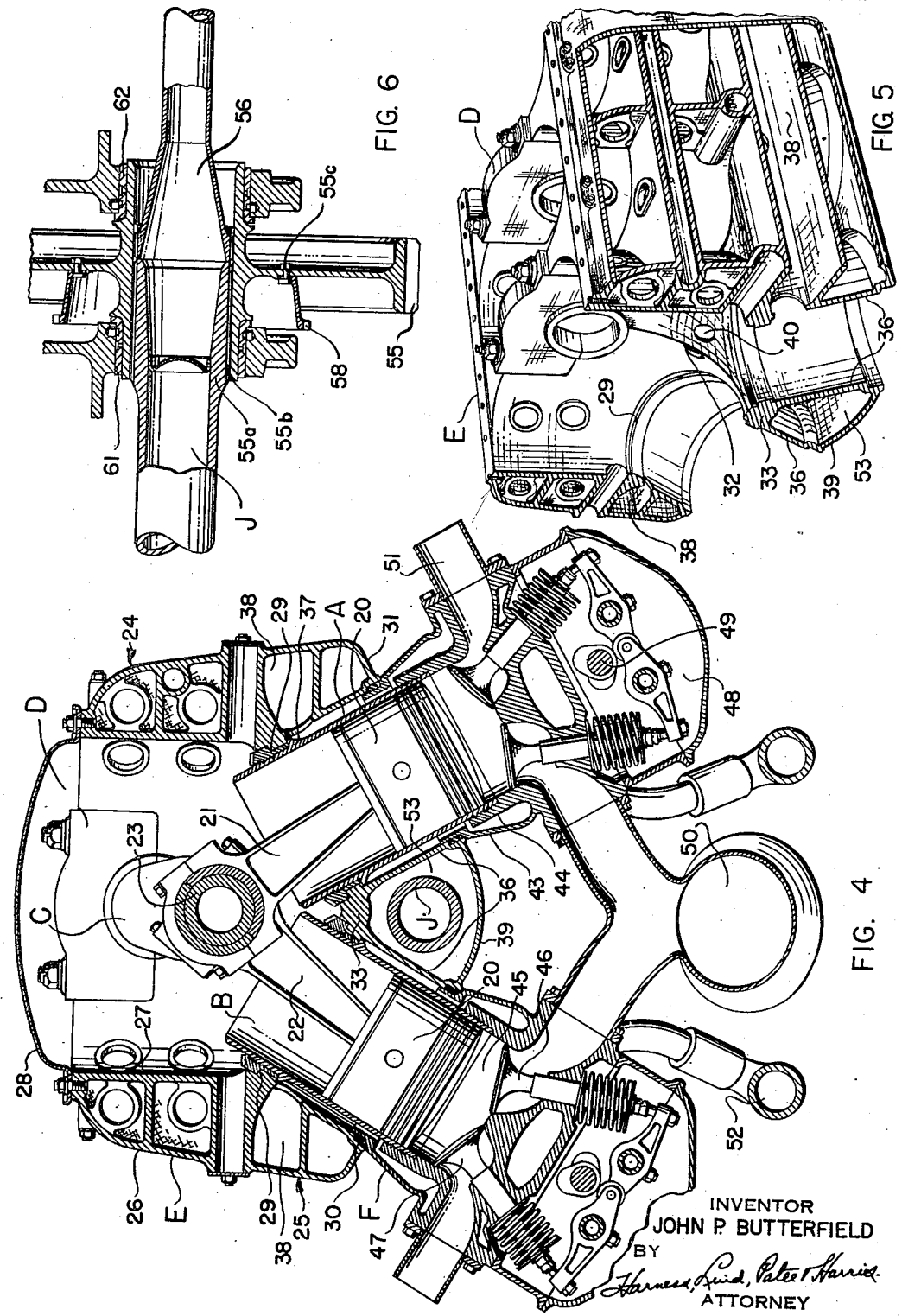

Patented June 8, 1948

2,442,917

UNITED STATES PATENT OFFICE 2,442,917

SUPPORTING STRUCTURE FOR BEARINGS FOR PISTON-CONNECTED SHAFTS

John P. Butterfield, Highland Park, Mich., assignor to Chrysler Corporation, Highland Park, Mich., a corporation of Delaware Application August 17, 1942, Serial No. 455,079

2 Claims. (Cl. 121—194)

This invention relates to supporting structures for shaft bearings.

Heretofore it has been customary to locate the reduction gearing for the propeller drive at one end of the engine, ordinarily the front end for a tractor type of propeller, and to provide a bearing support for the propeller drive shaft both fore and aft of the reduction gearing. Such arrangement results not only in the transmission of very high reduction gear loads to the propeller shaft bearings, but also in very high bearing loads due to gyroscopic action of the propeller. The loading due to this gyroscopic action is a function of the bearing span or distance between the aforesaid propeller shaft bearings and such span has therefore been made as large as practicable in efforts to minimize the severe bearing loads due to gyroscopic action in addition to the reduction gear loads. This gives rise to objectionable overhang of the propeller and reduction gearing beyond the engine and under the best compromise conditions of bearing span the resulting loads are so high that ball or roller anti-friction bearings of undesired weight, cost, and size are required.

It is an object of my invention to overcome the difficulties and objections aforesaid.

Another object is to provide a propeller drive system in which the bearing loads are so minimized as to accommodate use of a relatively light weight, inexpensive, and compact plain bearing of the journal type as distinguished from the aforesaid anti-friction ball or roller type, especially in conjunction with the innermost of the pair of propeller shaft supports.

A further object is to provide an arrangement in which the bearing span may be made relatively longer than heretofore practicable and at the same time provide relatively less overhang of weight beyond the engine thereby minimizing gyroscopic propeller loads, provide an engine of less length and weight, and accommodate use of a plain bearing, when desired, for supporting the propeller drive shaft.

An additional object is to provide a system in which the propeller drive reduction gearing is located remotely from the propeller end of the engine, preferably in a region midway of the length of the engine crankshaft thereby accommodating location of the outermost of the pair of propeller shaft bearings at or close to the propeller end of the engine with minimization of overhang for support of this bearing. In such arrangement the span between the bearings may be said to overlap the engine.

A still further object is to provide an improved propeller drive system for an engine of the V-type in which the driving elements are so arranged as to accommodate extension of the propeller shaft into the V-space in which it is supported on a relatively wide span accommodating use of a bearing in the V-space.

Another object is to provide an improved propeller shaft having portions thereof of relatively different degrees of torsional rigidity and resistance to bending. Thus, I have provided a shaft having one end thereof, between the aforesaid bearings, of a relatively rigid character for minimizing propeller deflection, the remaining portion of the propeller shaft, which is not subjected to severe bending loads, being of a torsionally flexible nature adapted to dampen and minimize the torque pulsations delivered by the engine crankshaft.

An additional object of my invention is to provide a V-type engine incorporating a propeller shaft bearing structurally supported in a plane containing one of the crankshaft intermediate bearings as distinguished from an end bearing, viz., a crankshaft bearing adjacent which a crank throw is disposed both fore and aft of this crankshaft bearing, these propeller and crankshaft bearings being directly structurally connected together in such plane.

Another object is to provide a V-engine in which the aforesaid propeller and crankshaft bearings are directly structurally connected together through the intermediary of at least a portion of a pedestal support, preferably of hollow pyramidal formation, extending between the crankshaft bearing and the cylinder seating casing portions for the pairs of transversely aligned V-arranged cylinders which are respectively disposed fore and aft adjacent such crankshaft bearing.

Further objects and advantages of my invention will be more apparent from the following detailed description of one illustrative embodiment thereof, reference being made to the accompanying drawings in which:

Fig. 1 is a sectional elevational view of an engine with parts broken away to illustrate the forward portion of the engine according to section line 1—1 of Fig. 2.

Fig. 2 is a transverse sectional elevational view taken as indicated by line 2—2 of Fig. 1.

Fig. 3 is an enlarged sectional elevational view of a portion of the propeller drive as seen in Fig. 1.

Fig. 4 is a transverse sectional elevational view taken as indicated by line 4—4 of Fig. 1.

Fig. 5 is a perspective view of a portion of the engine casing cut as indicated by line 5—5 of Fig. 1, parts being broken away.

Fig. 6 is a sectional elevational view illustrating the drive and mounting for the inner end of the propeller shaft.

Referring to the drawings I have illustrated my invention in the form of an aircraft engine, the particular engine chosen for illustrative purposes having sixteen liquid-cooled cylinders arranged in two banks of eight cylinders, each bank having its cylinders disposed in line or tandem. The clylinders of the banks are shown arranged as an inverted V although my invention is equally well adapted to engines of the upright V-type.

The particular engine illustrated comprises eight pairs of transversely contiguous V-arranged cylinders A and B, the cylinders of each pair having their axes disposed in a plane perpendicular to the longitudinal vertical mid-plane of the engine and the cylinders of each of the two banks have their axes disposed in a common plane extending longitudinally of the engine. Each cylinder A or B slidably receives a working piston 20 operating through a connecting rod 21 or 22 bearing on the same throw or crank 23 of the eight-throw crankshaft C which is journalled adjacent each throw by a crankcase main bearing D. The crank shaft is disposed along the apex of the V-arranged banks of cylinders.

The crankcase or case E comprises a unitary casting of light weight alloy of aluminum or magnesium for example. This case has a pair of transversely spaced longitudinally extending hollow reinforcing side structures 24, 25 each formed with a double wall comprising an outer wall 26 and inner wall 27 merging together at the top of the case to seat the crankcase pan or cover 28.

The upper portions of the hollow side structures 24, 25 provide a crankshaft chamber defined by those portions which extend from the annular cylinder seats 29 to the pan 28 whereas the lower portions of the hollow side structures provide cylinder-bounding hollow portions adjacent cylinders A and B respectively and are defined by those portions which extend from the annular seats 29 to the plastic sealing rings 30 for the cylinder heads F. The outer wall 26 of each hollow side structure slopes from pan 28 to provide the outer boundary of the upper and lower hollow portions of such side structures and is then directed inwardly at 31 to merge with the inner wall at the seal 30.

The inner walls 27 at the upper portions of the two hollow side structures 24, 25 are so arranged as to directly tie together the two seats 29 of each transversely aligned pair of V-arranged clylinders A and B with those main bearings D which are disposed immediately adjacent such cylinders so as to form a hollow pyramidal pedestal or support G of X-brace effect between the cylinder-loaded casing regions and the main bearings. Thus the inner walls 27, adjacent a pair of V-arranged cylinders A and B, are horizontally arched between adjacent main bearings D. These arched wall portions continue inwardly below bearings D to intersect or merge at 32 and to flare or sweep into the thickened annular casing portions which define the cylinder seats 29 merging at 33 between the adjacent V-arranged cylinders at which regions the intersecting portions 32 of adjacent pedestals G also merge into the upper face of the portion 33.

The desired hollow or double wall reinforcement is preserved along the hollow side structures 24 and 25 adjacent the crankshaft bearings by reason of the successive horizontally arched portions of the inner walls 27 merged at their adjacent ends between adjacent cylinders A and between adjacent cylinders B as at 34. The oppositely disposed inner walls 27 are joined at 35 at the apex of the pyramidal bearing support G immediately below each bearing D and then separate therebelow to provide the pyramidal support G of hollow formation. It will be apparent that the sweeping portions of inner walls 27 define a series of crankcase chamber portions bounded longitudinally by adjacent bearings D and pyramidal supports G.

Referring now to the lower cylinder-bounding portions of the hollow side structures 24 and 25, the case E is formed with the transversely aligned pairs of V-arranged tubular portions 36 which receive cylinders A and B respectively, these tubular portions extending between the cylinder seats 29 and seals 30. Each cylinder A and B has, adjacent its inner end, an annular shoulder 37 for seating on one face of a seat 29. A clamp ring threadedly engages each cylinder and the other face of the associated seat 29 thereby rigidly clamping the cylinders to the inner ends of the respective tubular portions 36, the cylinders being in jacketing relationship with the tubular portions. Appropriate horizontal and vertical floors or webs integrally join the inner and outer walls of the hollow side structures 24 and 25 to provide reinforcement therefor and coolant headers 38.

The sloping inwardly directed wall portions 31 define the outer boundaries of the tubular portions 36 and are merged between adjacent pairs of the V-arranged cylinders to provide a longitudinally extending bottom case wall portion 39 which, in effect, thereby forms the bottom wall of the case having the openings at tubular portions 36. This bottom wall serves to enclose the propeller drive shaft, hereinafter referred to, and also to collect lubricant draining from bearings D and the crankcase compartments, this lubricant draining through openings 40 in the supports G and thence to suitable pipes 41 and gear pan 42 for eventual return by appropriate scavenging pumps and pressure system for redistribution to the engine parts which require lubrication. The lubrication system does not form a part of my invention.

Each cylinder head F has an outer cylindrical portion 43 entering the outer end portion of an associated tubular case portion 36 and an inner cylindrical portion 44 threadedly carrying the associated cylinder A or B at its outer end. Each cylinder head is provided with a combustion chamber portion 45 and intake and exhaust valves 46, 47 respectively, these valves being driven by suitable valve gear 48 operated in appropriately timed relationship with crankshaft C by the camshafts 49. An intake manifold 50 supplies an air or fuel and air mixture charge to the various combustion chambers 45, the exhaust gases being conducted at pipes 51. Coolant is admitted to the jacketing portions of the cylinder heads at pipes 52, the coolant circulating inwardly to the aforesaid headers 38.

The general engine construction as thus far hereinbefore described in detail with reference to the structure of case E and cylinder heads F is more particularly set forth and claimed in the copending application of Herreshoff et al. Serial No. 446,560, filed June 11, 1942, and is only briefly alluded to herein insofar as such subject matter is a part of certain aspects of my invention.

In carrying out my invention I provide a propeller H of any known type drivingly mounted on the forward end of a propeller drive shaft J. This shaft extends longitudinally of the engine in the V-space 53 provided by the V-arranged banks of cylinders so that it passes above the bottom wall 39 and between the tubular case portions 36 and below the merged portions 33 in association with those cylinders A and B which lie forwardly of a transverse plane through the mid-length of crankshaft C inasmuch as the propeller H is herein illustrated as a "pulling" or tractor type for mounting at the forward end of the engine and aircraft in which the engine is to be installed. For "pusher" types of propellers then the propeller and its driving shaft would extend rearwardly of the engine and aircraft instead of forwardly.

At the aforesaid mid-length of the crankshaft, the latter carries a power take-off gear 54 meshing with a larger driven gear 55 which, as shown in Fig. 6, has its hub 55$^a$ splined for driving engagement with the splined rear end 55$^b$ of the propeller drive shaft J, the reduction gearing thus afforded being of appropriate ratio not only to drive the propeller H at reduced speed from crankshaft C but also to drive the various accessories and valve gearing at the desired timed relationship with the crankshaft. Certain of these accessories are diagrammatically illustrated at K at the rear of the engine for drive from a shaft 56 to the gear box 57. The shaft 56 has an externally splined end portion engaging the splines of the gear hub 55$^a$ so as to be driven from gear 55, this shaft extending between the rear groups of V-arranged banks of cylinders just as referred to hereinabove in connection with the positioning of shaft J in association with the forward groups of V-arranged cylinders. Mounted at 55$^c$ on gear 55 so as to rotate therewith (Fig. 6) is a gear 58 operating through a gear train which is in part illustrated at 59 in Fig. 1 for driving the camshafts 49.

At the mid-region of the engine, the case E is formed with a gear chamber bounded by transverse walls 60, this chamber being adapted to receive the gears 54 and 55. Such construction requires modification of the pedestal supports between the crankshaft bearings D' which lie adjacent walls 60 respectively and which merge with the annular cylinder seats for the pairs of V-arranged cylinders adjacent these walls. These pedestal supports are of semi-pyramidal construction G' in that they are half portions of the supports G. Each wall 60 in effect forms one of these semi-pyramidal supports and these walls extend below the supports G' to provide supports for bearings 61, 62 for the opposite end portions of the gear hub 55$^a$, at locations closely adjacent gear 55.

Inasmuch as I have located the reduction gearing 54, 55 at a point remote from the end of the engine adjacent which the propeller H is located, I am thereby enabled to support the propeller and shaft J close to the front end of the engine without objectionable overhang of the propeller. To this end I have provided a bearing L preferably of the anti-friction roller thrust type carried by a housing support bracket 63 secured by fasteners 64, 65 to the front end of case E. This bearing rotatably supports the front end portion of shaft J as the front end of the engine transmits the axial thrusts from the propeller through bracket 63 to the case E.

The second bearing M may be spaced from bearing L as far as desired so as to minimize the loading due to gyroscopic action of the propeller and hence enable use when desired of a plain journal type of bearing at M. By preference the bearing M is supported between the casing bottom wall portion 39 and one of the pyramidal supports G as for example the front support G which is associated with the four seats 29 for the four cylinders of the two adjacent pairs of V-arranged cylinders A and B which are disposed at the front or propeller end of the engine. At this support I provide the casing casting E with a vertical supporting web 66 which lies in a plane along line 2—2 so that it extends within this hollow support G and structurally connects the apex region thereof at 35 with the bottom case wall 39.

The web 66 merges with the sloping walls of the support G in the plane at 2—2 as best seen in Fig. 2 and, between the bottom wall 39 and the cylinder seat portions 29, this web is enlarged longitudinally of the engine to provide the cylindrical opening in the shaft-supporting boss 67 of the bearing M. As is sometimes customary for a plain type bearing, the bearing M is shown provided with the lining 68 of bearing material in engagement with shaft J. However, in many instances it is not necessary or desirable to provide any bearing lining and in such instances the journal portion 68' of shaft J may bear directly in the boss 67. This depends largely on the material of case E and when of magnesium alloy, for example, the bearing lining may be omitted. When case E is of aluminum alloy it is generally preferred to employ the bearing lining 68. In order to include the bearing M in the general lubricating system for the crankshaft C, the web 66 is drilled at 69 for passage of lubricant downwardly from the associated bearing D to the bearing M.

A second web 70 is included in the support for bearing M and extends in a direction longitudinally of the engine in the vertical mid-plane thereof joining the boss 67 and web 66 with the inner walls of the hollow support G at the region of the intersection 32. It will be apparent that the bearing M is rigidly carried between a bearing D and bottom wall 39 and is further tied in or braced with a hollow support G which directly extends for structurally connecting this bearing D with the aforementioned four cylinder seats. The webs 66 and 70 provide an X-brace for joining the boss 67 with the interior of the hollow pyramidal support G. During the combustion of the charge in the chamber 45 of any cylinder head it will be apparent that the crankshaft C and the cylinder carrying such head will be forced apart and stresses incident thereto are efficiently resisted by the associated support G supplemented at the region of bearing M by the webs 66 and 70 and the bottom wall 39. These forces are in turn efficiently resisted by the case E including the hollow side structures 24 and 25 with minimum accompanying deflection in the case from the loads at the bearings for crankshaft C and shaft J.

By reason of the reduction gearing 54, 55 as well as gearing 58, 59 being located rearwardly of the inner bearing M where the gear loads are taken by bearings 61 and 62 independently of shaft J, the bearings L and M are thereby relieved of the loads incident to operation of these gears and such location enables the positioning of bearing L close to the front of the engine with minimum overhang of the propeller H. Furthermore, this location of the reduction gearing accommodates location of the bearing M within the V-space 53 rearwardly from the propeller end of the engine. This in turn provides a wide span between bearings L and M, this span overlapping or telescoping the front end portion of the engine with resulting minimization in engine length, propeller overhang, and loading of the bearings. The resulting minimization of loading due to gyroscopic propeller forces and the elimination of reduction drive gear loads from bearings L and M enables me to use a plain bearing at M this being very desirable from the standpoint of minimization of weight, cost and space required. Even where reduction gearing is not desired for the propeller drive, my arrangement of location of bearings L and M is advantageous in shortening the length of the engine, reducing loads on the case E incident to operation of the propeller, and in enabling use of a plain bearing at M.

By "plain" bearing in reference to the bearing M I mean what is accepted by customary engineering terminology to designate a bearing of the journal type as distinguished from the roller or ball anti-friction bearing types. This may well be illustrated by reference to the plain type of bearings at D, D', and M in contrast with the roller type bearing L.

As a further feature of my invention I have provided in a single shaft J a structure which, in conjunction with bearings L, M, and 61, 62 functions to isolate or separate the desirable characteristics of rigidly supporting the propeller H and providing a flexible drive for the propeller.

The propeller H should be provided with a stiff and rigid support to resist propeller loads and deflections. On the other hand the engine has no flywheel in the ordinary sense and its delivery is very rough owing to the torque pulsations. It is therefore desirable to provide some means for smoothing out these pulsations before they reach the propeller. I have accomplished these desirable characteristics by constructing shaft J of a relatively stiff portion between its supports at bearings L and M, whereas the rear portion between bearing M and gear 55, which does not have to carry the propeller or gear loads, is made as light and as torsionally flexible as possible while enabling it to transmit the torque from gear 55 to the propeller H. As shown in Fig. 3 the shaft J is preferably of tubular or hollow construction with a relatively small diameter and thin or light wall at 71 for the torque input shaft portion between journal portion 68' and the gear 55, and with a relatively large diameter and thick or heavy wall at 72 for the bearing span portion of the shaft from bearing L to and including the journal portion 68'. Obviously the desired results may be obtained by employing a solid propeller drive shaft with appropriate differences in relative diameters for the bearing span portion and the torque input portion to provide the rigid and flexible properties to these shaft portions respectively. The wall of shaft J is made somewhat thicker at the region of splines 55$^b$ than between the gear 55 and journal portion 68' in order to strengthen it at its region of connection with gear 55.

I claim:

1. A structure having two rows of generally cylindrical openings, the opening of each row being arranged with their axes parallel and extending generally transversely to the direction of the row, the two rows of openings being arranged with respect to one another so as to cause each opening of one row to be opposite a certain opening of the other and the axes of said each opening and said certain opening to form an acute angle, a first bearing positioned between adjacent pairs of opposite openings of the two rows and generally on a line between the intersections of the axes of the pairs of openings, walls swept to the first bearing from the ends of the said adjacent pairs of openings adjacent the first bearing to form a hollow generally pyramidal support for the first bearing, a second bearing positioned within the rows of openings and between the said adjacent pairs of openings, and a support for the second bearing extending between the bearings and within the hollow pyramidal support.

2. The structure specified in claim 1 and also having a third bearing alined with the first bearing in spaced relation thereto and being adjacent to but displaced from a third set of opposed openings along the line of the first and third bearings, walls swept from the adjacent ends of the third set of opposed openings to the third bearing to form a hollow generally semi-pyramidal support therefor, a fourth bearing alined with the third bearing and opposite the second bearing, and a support for the fourth bearing extending separately thereto from the third bearing and a region of the last mentioned swept walls spaced from the third bearing.

JOHN P. BUTTERFIELD.

REFERENCES CITED

The following references are of record in the file of this patent:

UNITED STATES PATENTS

| Number | Name | Date |
| --- | --- | --- |
| 1,280,760 | Kirkham | Oct. 8, 1918 |
| 1,312,555 | McCain | Aug. 12, 1919 |
| 1,316,527 | White | Sept. 16, 1919 |
| 1,318,209 | Jouffret | Oct. 7, 1919 |
| 1,319,510 | Birkigt | Oct. 21, 1919 |
| 1,342,634 | Laycock | June 8, 1920 |
| 1,370,692 | Kirkham | Mar. 8, 1921 |
| 1,386,489 | Birkigt | Aug. 2, 1921 |
| 1,394,870 | Thomas | Oct. 25, 1921 |
| 1,553,854 | Fornaca | Sept. 15, 1925 |
| 1,585,631 | Heinrich | May 18, 1926 |
| 1,634,017 | Cappa | June 28, 1927 |
| 1,851,051 | Loeffler | Mar. 29, 1932 |
| 1,889,305 | Zerbi | Nov. 29, 1932 |
| 1,978,922 | Wemp | Oct. 30, 1934 |
| 2,201,893 | Gadoux | May 21, 1940 |
| 2,254,439 | McCarthy | Sept. 2, 1941 |
| 2,297,400 | Friedrich | Sept. 29, 1942 |
| 2,371,873 | Martin | Mar. 20, 1945 |

FOREIGN PATENTS

| Number | Country | Date |
| --- | --- | --- |
| 499,095 | Great Britain | 1935 |
| 300,445 | Germany | Sept. 11, 1917 |